US012585484B2

(12) United States Patent
Liu et al.

(10) Patent No.: US 12,585,484 B2
(45) Date of Patent: Mar. 24, 2026

(54) GENERAL NETWORK POLICY FOR NAMESPACES

(71) Applicant: VMware, Inc., Palo Alto, CA (US)

(72) Inventors: Danting Liu, Beijing (CN); Qian Sun, Beijing (CN); Jianjun Shen, Redwood City, CA (US); Wenfeng Liu, Beijing (CN); Donghai Han, Beijing (CN)

(73) Assignee: VMware, Inc., Palo Alto, CA (US)

( * ) Notice: Subject to any disclaimer, the term of this patent is extended or adjusted under 35 U.S.C. 154(b) by 811 days.

(21) Appl. No.: 17/821,232

(22) Filed: Aug. 22, 2022

(65) Prior Publication Data

US 2024/0028358 A1    Jan. 25, 2024

(51) Int. Cl.
 *G06F 15/173*     (2006.01)
 *G06F 9/455*      (2018.01)
 *H04L 9/40*       (2022.01)
(52) U.S. Cl.
 CPC ...... *G06F 9/45558* (2013.01); *H04L 63/0263* (2013.01); *H04L 63/20* (2013.01); *G06F 2009/4557* (2013.01); *G06F 2009/45595* (2013.01)
(58) Field of Classification Search
 None
 See application file for complete search history.

(56) References Cited

U.S. PATENT DOCUMENTS

2019/0386891 A1 * 12/2019 Chitalia ................. G06F 3/048
2020/0218798 A1 *  7/2020 Kosaka .................. G06F 9/451
2021/0218652 A1 *  7/2021 Raut ...................... H04L 43/20
2023/0104129 A1 *  4/2023 Miriyala ................ H04L 69/03
                                                    709/220

* cited by examiner

*Primary Examiner* — Wing F Chan
*Assistant Examiner* — Andrew Woo
(74) *Attorney, Agent, or Firm* — King Intellectual Asset Management

(57) ABSTRACT

Disclosed herein is a system and method for controlling network traffic among namespaces in which various entities, such as virtual machines, pod virtual machines, and a container orchestration system, such as Kubernetes, reside and operate. The entities have access to a network that includes one or more firewalls. The traffic that is permitted to flow over the network among and between the namespaces is defined by a security policy definition. The security policy definition is posted to a master node in a supervisor cluster that supports and provisions the namespaces. The master node invokes a network manager to generate a set of firewall rules and program the one or more firewalls in the network to enforce the rules.

20 Claims, 17 Drawing Sheets

| Pod VMs 224 | VMs 222 | Kubernetes cluster (KC) 226 |
|---|---|---|

Admin Rules
(Master Node -> pods/VM/KC)
602

Security Policy (customizable)
604

Network Policy
(customizable)
606

Baseline Policy
(intra-namespace connectivity)
608

Egress Policy Example

```
1  apiVersion: nsx.vmware.com/vialpha1                              802
2  kind: SecurityPolicy
3  metadata:
4      name: egress-policy-1
5      namespace: ns-1
6  spec:
7      priority: 20
8      appliedTo:
9      vmselector:
10          matchLabels:
11              user: internal
12      podSelector:
13          matchLabels:
14              env: dev
15      rules:
16        -direction
17        action: allow
18        ports:
19          - protocol: UDP
20          port: 53
21          -direction: out
22          action: drop
```

FIG. 8

Ingress Policy Example

```
1  apiVersion: nsx.vmware.com/v1alpha1                         902
2  kind: SecurityPolicy
3  metadata:
4      name: ingress-policy-1
5      namespace: ns-1
6  spec:
7      priority: 30
8      appliedTo:
9      - vmSlelector
10         matchLabels:
11             role: db
12  rules:
13     - direction: in
14     action: allow
15     sources:
16     podSelector:
17         matchLabels:
18             role: frontend
19     ports:
20     -protocol: TCP
21     port: 8000
```

FIG. 9

Isolation Rule

```
1  apiVersion: nsx.vmware.com/v1alpha1          1002
2  kind: SecurityPolicy
3  metadata:
4      name: isolate-policy-2
5      namespace: ns-1
6  spec:
7      priority: 20
8      appliedTo:
9          - podSelector: {}
10         - vmSelector: {}
11 rules:
12     - direction: in
13     action: drop
14     - direction: out
15     action: drop
```

FIG. 10 access service rule

```
1  apiVersion: nsx.vmware.com/v1alpha1                    1102
2  kind: SecurityPolicy
3  metadata:
4      name: access-db-policy
5      namespace: ns-3
6  spec:
7      priority: 10
8      applicedTo:
9        - vmSelector:
10           matchLabels:
11               role: db
12 rules:
13     - direction: in
14       action: allow
15       sources:
16          - podSelector:
17              matchLabels:
18                    role: ui
19          - podSelector:
20              matchLabels:
21                    role: client
22            namespaceSelector:
23              matchLabels:
24                    role: frontend
25       ports:
26        - protocol: TCP
27          port: 22
```

FIG. 11

LB-internal-allow-IP_rule

```
1  apiVersion: networking.k8s.io/v1                    1202
2  kind: NetworkPolicy
3  metadata:
4      name: networkpolicy-deny-ingress
5      namespace: demo
6  spec:
7      podSelector: {}
8      policyTypes:
9      - Ingress
10 ---
11 apiVersion: nsx.vmware.com/v1alpha1
12 kind: SecurityPolicy
13 metadata:
14     name: lb-snat-ip-policyTypes
15     namespace: ns-1
16 spec:
17     priority: 100
18     rules:
19       - direction: ingress
20         action: allow
21         sources:
22           - ipBlocks:
23               - cidr: 100.64.232.1/32
```

FIG. 12 match expression

```
1  apiVersion: nsx.vmware.com/v1alpha1                    1302
2  kind: SecurityPolicy
3  metadata:
4      name: expression-policy-1
5      namesapace: ns-1
6  spec:
7      appliedTo:
8        - podSelector:
9            matchLabels:
10               user: internal
11               # env: dev
12  matchExpressions:
13      - {key: k2, operator: NotIn, values: [b1,b2]}
14      - {key: k2, operator: NotIn, values: [b1,b2,b3]}
15      - {key: k1, operator: In, values: [a1,a2,a3]}
16      # - {key: k3, operator: In, values: [c1, c2]}
17  rules:
18      - direction: Out
19        action: Allow
```

FIG. 13

GENERAL NETWORK POLICY FOR NAMESPACES

CROSS-REFERENCE TO RELATED APPLICATIONS

This application claims priority to International Patent Application No. PCT/CN/2022/106688, filed Jul. 20, 2022, entitled "A GENERAL NETWORK POLICY FOR NAMESPACES", and assigned to the assignee hereof, the contents of each of which are hereby incorporated by reference in its entirety.

BACKGROUND

A container orchestrator such as Kubernetes is a system that deploys and manages applications written as microservices. A microservice of the application runs in a container, and one or more containers run in a pod. Kubernetes, for example, is implemented as a cluster of worker nodes, to which the pods are assigned to run, and a master node, which includes a software interface, called an application programming interface (API) server, to the external world. Kubernetes can run on any system, such as a public or private cloud, a data center, or a set of servers, by being allocated a set of resources from those systems. Resources needed by Kubernetes include an address space, storage, and networking. A namespace is a portion of the address space allocated to a portion of the Kubernetes system. In Kubernetes, pods are the unit of deployment, and the pods contain one or more containers and are assigned a network address for communication among pods.

Pod virtual machines are virtual machines with a guest operating system designed for running containers. The pod virtual machines include a virtual central processing unit (CPU), virtual memory, virtual persistent storage, virtual networking interfaces, and a container runtime for executing containerized applications.

A Software Defined Network (SDN) is a networking approach that separates a network's functions into a data plane, a control plane, and a management plane. The control plane controls the movement of data in the data plane, including via switches and routers, and can make a hierarchical arrangement of switches, routers, and gateways appear as a flat virtual network. The management plane manages the control plane and provides, among other items, security to the network.

To provide networking, such as SDN, in a Kubernetes-controlled system, a network container plugin (NCP) is added to the management plane of the SDN and may run within a Kubernetes cluster. The Kubernetes system then uses the network's data plane and control plane to transfer data among the pods in the system so that the pods can interact to carry out their assigned microservices.

A Kubernetes-controlled system allows users to define their own resources by defining a specification (e.g., which may be called a custom resource definition (CRD) in the context of Kubernetes) for a resource. Once the resource is specified and created, the Kubernetes-controlled system forces the state of the Kubernetes-controlled system to match the terms in the specification.

A Kubernetes-controlled system has a set of namespaces that can support various types of container systems and virtual machines residing in the namespaces. For example, a namespace can support virtual machines, pod virtual machines (VMs), and Kubernetes clusters. The namespaces isolate the virtual machines, pod virtual machines, and clusters they support. However, a namespace supporting a virtual machine cannot interact with a namespace supporting pod virtual machines or Kubernetes clusters.

It is desirable to have more control over the configuration of namespace communication so that pod virtual machines, Kubernetes clusters, and virtual machines residing in separate namespaces can interact with each other in a controlled manner.

SUMMARY

One embodiment provides a method for controlling network traffic among a plurality of namespaces. The method includes creating a security policy definition describing allowed traffic on a network, where the network includes one or more firewalls and one or more entities residing and operating in each namespace of the plurality of namespaces and where the entities have access to each other via the network. The method further includes sending the security policy definition to a node that supports the plurality namespaces. The node sends the security policy definition to a network manager that formulates a set of rules for the one or more firewalls controlling traffic in the network according to the security policy definition. The one or more firewalls then enforce the rules controlling the traffic. The security policy definition includes fields that control traffic to and traffic from a specified namespace, an allowed network traffic protocol for the namespace, and a priority.

Further embodiments include a computer-readable medium containing instructions that, when executed by a computing device, cause the computing device to carry out one or more aspects of the above method and a system comprising a memory and a processor configured to carry out one or more aspects of the above method.

BRIEF DESCRIPTION OF THE DRAWINGS

FIG. 8 depicts an egress policy example, in an embodiment.

FIG. 9 depicts an ingress policy example, in an embodiment.

FIG. 10 depicts an isolation rule, in an embodiment.

FIG. 11 depicts an access service rule, in an embodiment.

FIG. 12 depicts a load balancer internal allow IP rule, in an embodiment.

FIG. 13 depicts a match expression policy, in an embodiment.

DETAILED DESCRIPTION

A CRD can define a security policy that is used to apply network-based security to virtual computing instances (VCIs) such as virtual machines and pod VMs residing in different and isolated namespaces of a container orchestration system, such as within a Kubernetes cluster. The security policy allows the control of traffic between and among namespaces that are otherwise isolated from each other. Network tags label network data center objects for quick search and filtering for implementing such a security policy. The security policy for a namespace comprises many new data types used in a new definition called securityPolicyCRD. In one example, the securityPolicyCRD includes at least a spec field and a status field. The spec field defines a particular security policy in the given namespace and includes a category, a priority, a list of targets, and a list of rules. The status field indicates a realized state of the security policy and includes a list of conditions related to whether a desired policy can be implemented.

Figure 1:
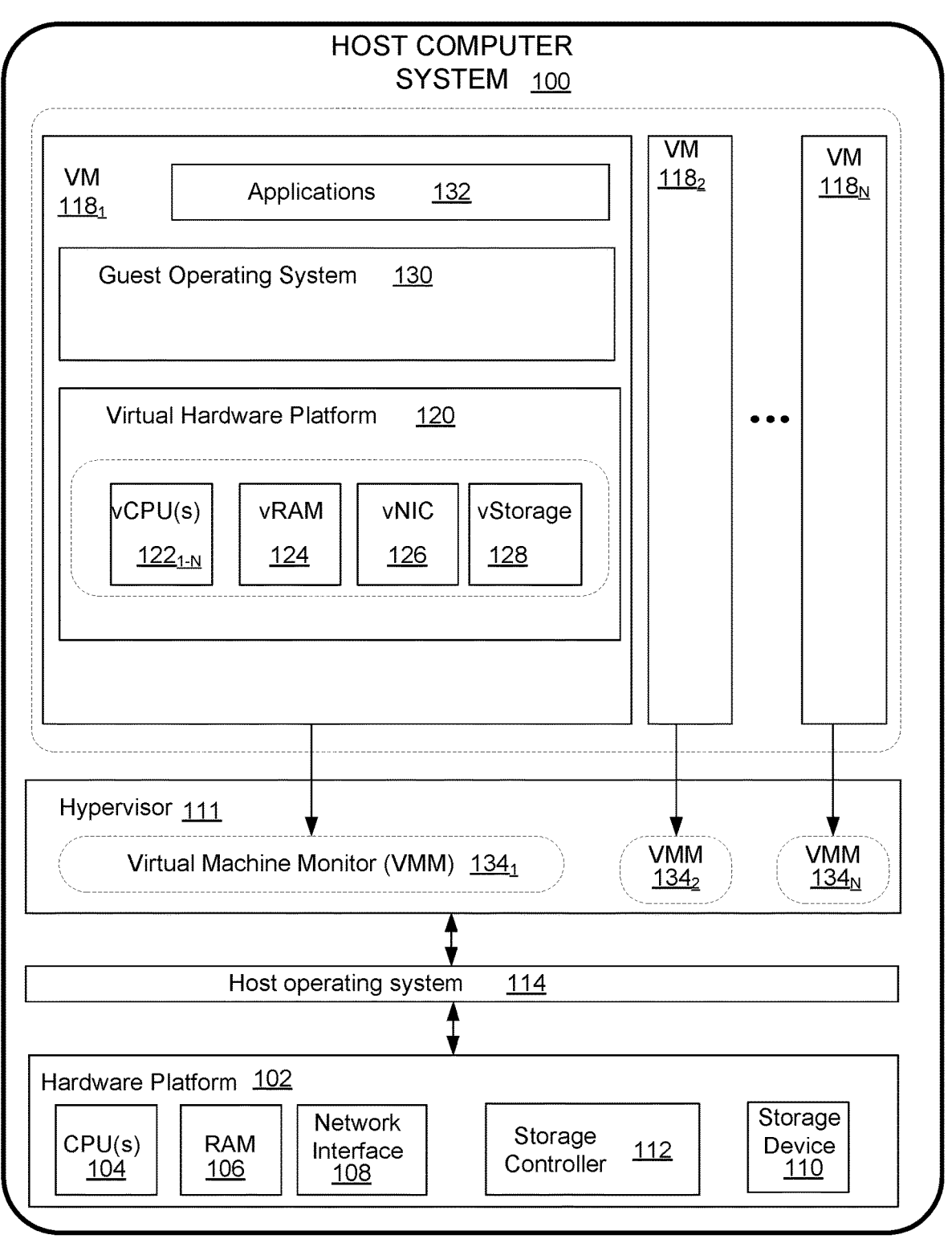
FIG. 1 depicts a block diagram of a host computer system that is representative of a virtualized computer architecture.

FIG. 1 depicts a block diagram of a host computer system 100 that is representative of a virtualized computer architecture. As illustrated, host computer system 100 supports multiple virtual machines (VMs) 118$_1$-118$_N$, an example of virtual computing instances that run on and share a common hardware platform 102. Hardware platform 102 includes conventional computer hardware components, such as random access memory (RAM) 106, one or more network interfaces 108, storage controller 112, persistent storage device 110, and one or more central processing units (CPUs) 104. Central processing units 104 may include processing units having multiple cores.

A virtualization software layer, hereinafter referred to as a hypervisor 111, runs on hardware platform 102. Hypervisor 111 makes possible the concurrent instantiation and execution of one or more virtual computing instances, such as VMs 118$_1$-118$_N$. The interaction of a VM 118 with hypervisor 111 is facilitated by the virtual machine monitors (VMMs) 134$_1$-134$_N$. Each VMM 134$_1$-134$_N$ is assigned to and monitors a corresponding VM 118$_1$-118$_N$. In one embodiment, hypervisor 111 may be ESXi available from VMware™ Inc. of Palo Alto, CA.

After instantiation, each VM 118$_1$-118$_N$ encapsulates a virtual hardware platform 120 that is executed under the control of hypervisor 111. Virtual hardware platform 120 of VM 118$_1$, for example, includes but is not limited to such virtual devices as one or more virtual CPUs (vCPUs) 122$_1$-122$_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of guest OS 130 include any of the well-known operating systems, such as the Microsoft Windows™ operating system, the Linux™ operating system, MAC OS, and the like.

Figure 2A:
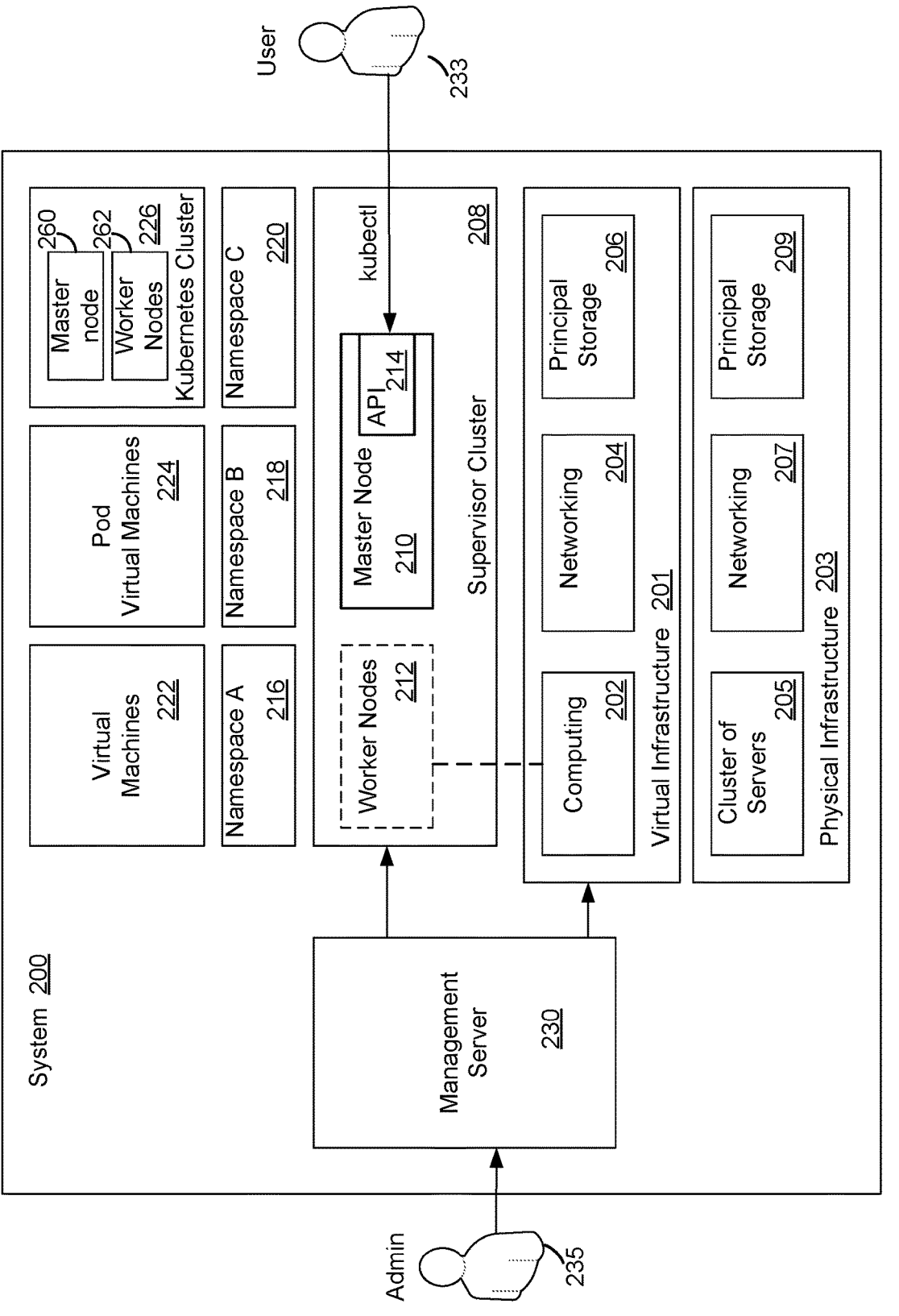
FIG. 2A depicts a system with a virtual machine, a pod virtual machine (pod VMs), and a Kubernetes cluster.

FIG. 2A depicts a system with a virtual machine, one or more pod virtual machines (pod VMs), and a Kubernetes cluster (which may be representative more generally of a container orchestration system). System 200 includes a physical infrastructure 203 with a cluster of physical servers 205, networking resources 207, and principal storage 209. The physical infrastructure supports a virtual infrastructure

201 that includes virtual computing resources 202, virtual networking resources 204, and virtual principal storage 206. The virtual networking resource 204 provides a control plane and a management plan that controls a data plane in physical networking resources 207.

System 200 also includes a Supervisor Cluster 208 that includes a set of worker nodes 212 and master node 210. The worker nodes 212 are provided by the computing resource 202 in the virtual infrastructure and perform the microservices of the application. The master node 210 includes authentication and authorization plugins, which are responsible for creating and managing Service Accounts. One type of authorization plugin is a role-based account access (RBAC) plugin. This type of plugin uses roles as the key factor in determining whether a user (or Service Account, see below) may perform an action or not. The user is associated with a role, and the role is allowed to perform certain actions on certain resources.

The master node 210 also includes an API for access, via kubectl commands, to the master node by user 233. The kubectl commands allow user 233 to access all parts of Supervisor Cluster 208 and the worker nodes 212. In addition, the API allows declarative manifests, often written in an object-based format such as YAML Ain't Markup Language (YAML) or JavaScript Object Notation (JSON), to be posted to create resources, change the operation, or collect information from the system 200.

A Service Account controls the resources that a pod has access to according to a namespace for the service account. A namespace allows a group of pods to access a set of resources, such as CPU, memory, and storage, assigned to the namespace and isolated from other namespaces. In some embodiments, the namespace is a local host namespace; in others, the namespace is a Kubernetes namespace. In the figure, virtual machines 222 reside in namespace A 216, pod virtual machines (further described in reference to FIG. 2B) reside in namespace B 218, while the Kubernetes cluster 226 (further described in reference to FIG. 2C), with its master node 260 and worker nodes 262, resides in namespace C 220. The virtual infrastructure 201 and the Supervisor Cluster 208 are controlled by a management server 230 to which administrator 235 has access. The management server 230 allows the administrator to configure the physical infrastructure 203 and virtual infrastructure 201 of system 200.

Figure 2B:
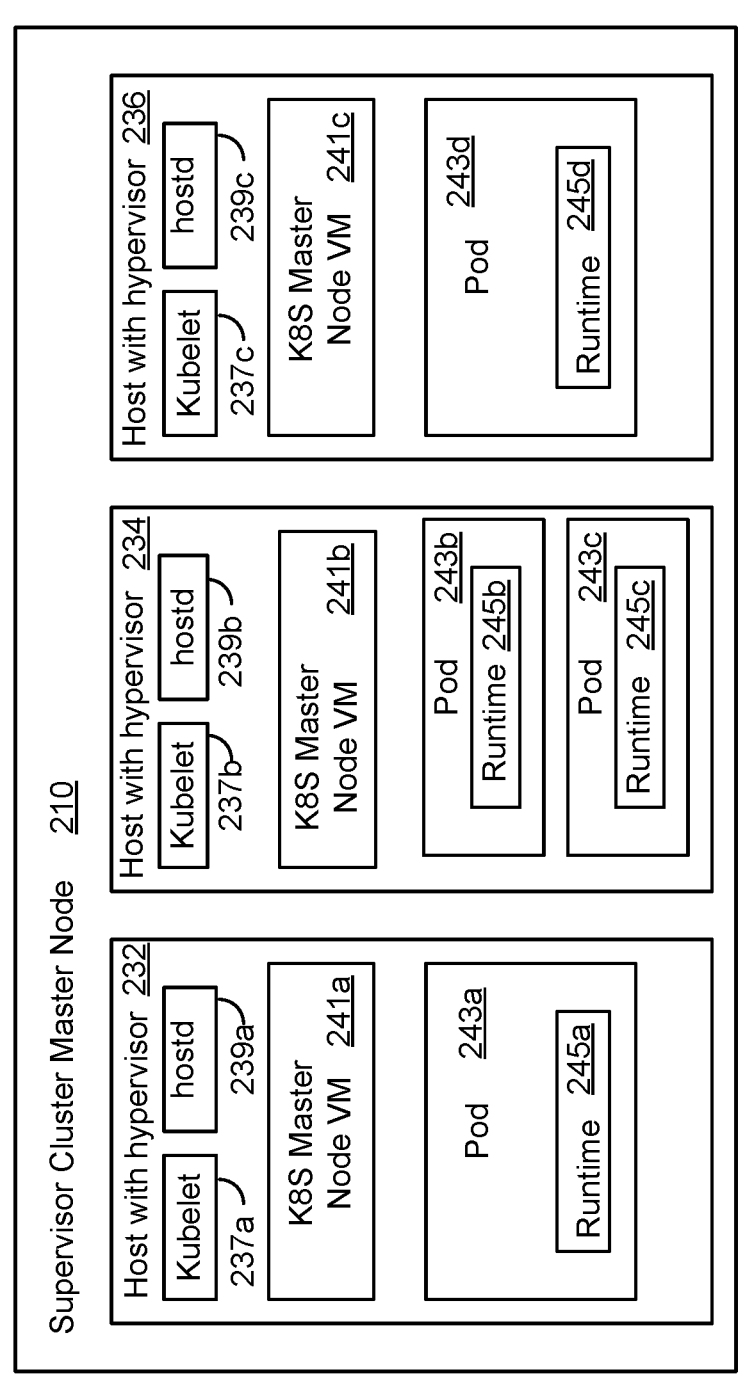
FIG. 2B depicts a supervisor cluster.

FIG. 2B depicts a supervisor cluster master node. The Supervisor Cluster master node 210 includes three host systems with hypervisors 232, 234, 236 that form a highly-available node. Each host with hypervisor 232, 234, 236 includes a Kubelet (or its equivalent) 237*a-c*, a host daemon service (hostd) 239*a-c*, a Kubernetes (K8s) master node virtual machine 241*a-c*, and one or more pods 243*a-d*, each of which has its own runtime 245*a-d*. The Kubelet or its equivalent 237*a-c* allows the host to join Supervisor Cluster 208. The master node virtual machine 241*a-c* runs an API server, a database, a scheduler, and a controller manager, which are all part of a Kubernetes master node 210.

Figure 2C:
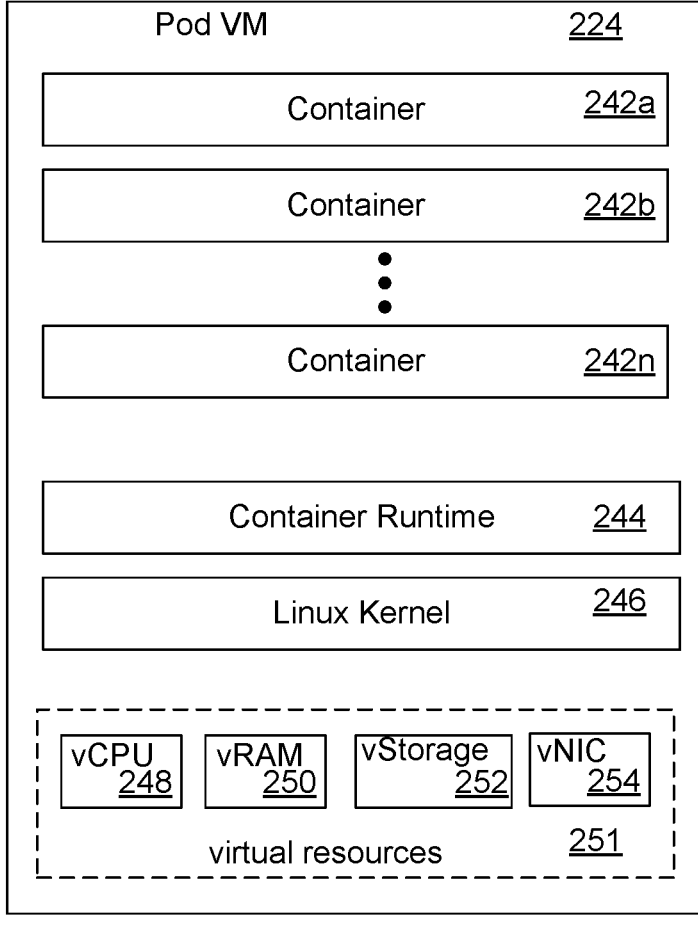
FIG. 2C depicts a pod VM.

FIG. 2C depicts a pod VM. The pod VM has access to virtual resources 251, which include virtual CPU 248 (a compute resource), virtual RAM 250, virtual storage 252, and a virtual network interface controller (vNIC) 254. The pod VM 224 also includes one or more Linux kernels 246 and container runtimes 244 running a set of containers 242*a-n*.

Figure 2D:
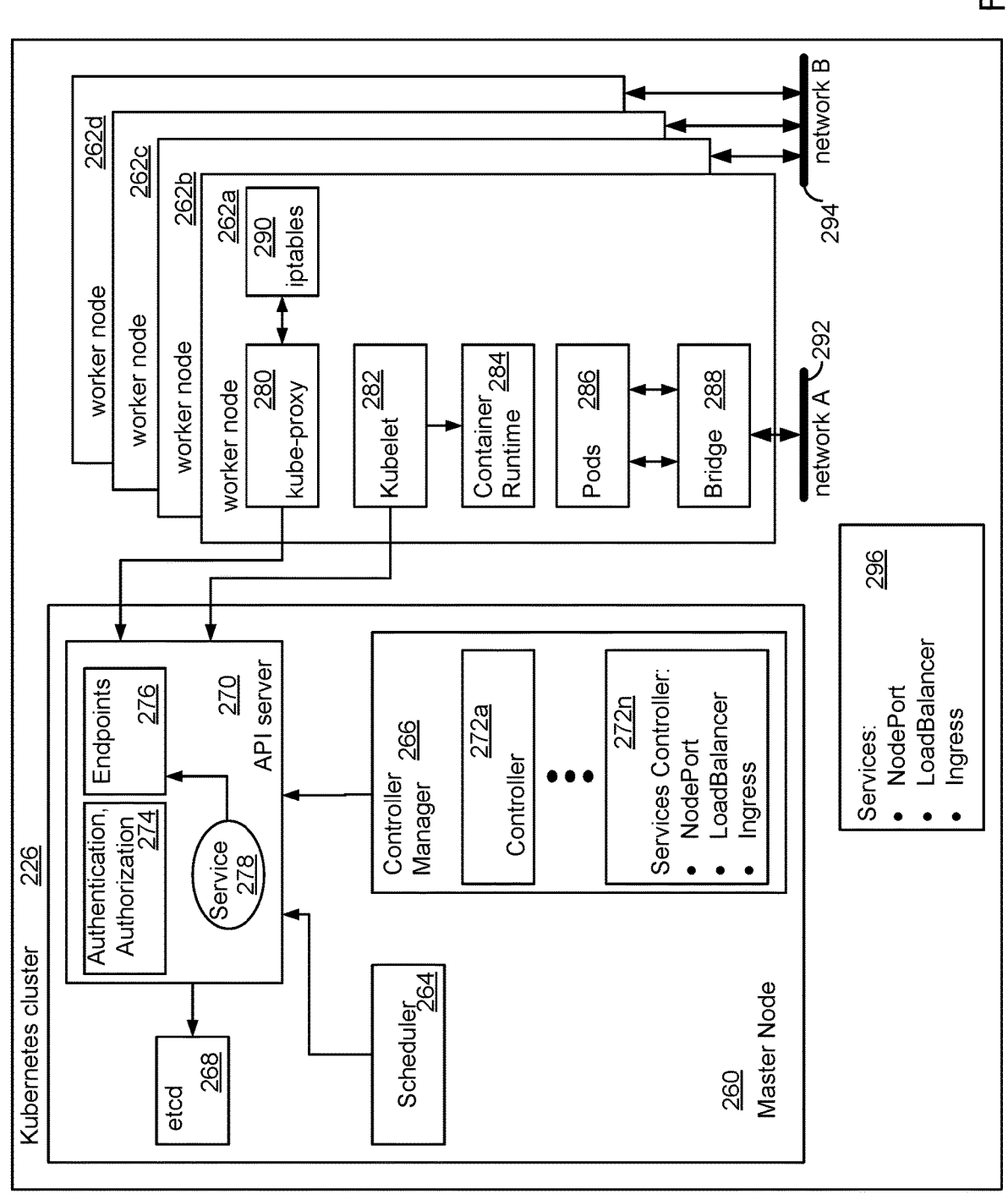
FIG. 2D depicts a Kubernetes cluster.

FIG. 2D depicts a Kubernetes cluster. The cluster includes a master node 260 and a set of worker nodes 262*a-d*. The master node 260 includes an API server 270, a scheduler 264, a controller manager 266, and a distributed data store called etcd 268. The API server 270 includes one or more services 278 and one or more endpoints 276. Services are resource objects that provide stable network connections to pods, and endpoints are resource objects that contain a list of network addresses and ports that expose an associated service to entities outside a Kubernetes cluster 226. The Controller manager 266 includes one or more controllers 272*a*-272*n*, some of which are services controllers, such as controllers for a NodePort service, LoadBalancer service, and Ingress service. The NodePort, LoadBalancer, and Ingress services 296 expose pods to an entity outside the cluster. The Ingress Services controller is a replication controller that forwards traffic to a set of pods.

The worker nodes 262*a*-*d* include a kube-proxy, iptables 290, a Kubelet 282, a container runtime 284, such as Docker, a set of pods 286, and a network bridge 288. The scheduler 264 assigns pods 286 to the worker nodes 262*a*-*d* for execution.

The API server 270 provides the create, read, update, and delete interface for querying and modifying the cluster state. It stores the state in the etcd data store 268. The API server 270 has a watch service. Every time an object is updated, the API server sends the new version of the object to each entity, such as a controllers 272*a*-*n*, watching the object.

The scheduler 264 waits for newly created pods through the API server's watch mechanism and assigns a node to each new pod. The scheduler updates the pod definition and then notifies the Kubelet 282 that the pod has been scheduled. When the Kubelet 282 sees that the pod has been scheduled to its node, it creates and runs the pod's containers.

The controller manager 266 watches the API server 270 for changes to resources, such as Deployments and Services, and performs operations for each change. Such operations include the creation of a new object, update or deletion of an existing object, creation of other resources, or updates to watched resources.

Controllers 272*a*-*n* run a reconciliation loop, which forces the actual state to match the desired state specified in the resource's specification, usually in the form of a set of declarations. Controllers 272*a*-*n* use the watch service to be notified of changes. Each controller connects to the API server 270 and, through the watch service, asks to be notified when a change occurs to a set of resources for which the controller is responsible. If a change occurs that causes a mismatch between the declarative specification and the current condition of the resource, the controller acts to correct the mismatch. Controllers include a Replication Manager, a ReplicaSet controller, a DaemonSet controller and Job controller, a Deployment controller, a StatefulSet controller, a Node controller, a Services controller, an Endpoints controller, a Namespace controller, and a Persistent Storage Volume controller. Each Services controller gets its own stable virtual IP address and port.

The etcd 268 is a fast, distributed, consistent key-value store for storing the cluster state and metadata.

The Kubelet 282 runs on worker nodes 262*a*-*d* and is responsible for everything running on the worker node 262*a*-*d*. It registers the node on which it is running by creating a node resource in the API server 270. It continuously monitors the API server 270 for pods scheduled to the node and starts the pod's containers by telling the container runtime 284 to run a container from a specific container image. The Kubelet 282 monitors the running containers and reports their status, events, and resource consumption to the API server 270.

The kube-proxy 280 ensures that clients can connect to the services defined through the API server. The kube-proxy 280 ensures connections to the Service IP and port end up at one of the pods backing the service. The kube-proxy makes a service available on the node it runs on by setting up rules in the iptables 290, where the rules assure that each packet destined for the service IP and port pair is intercepted and its address modified so that the packet is redirected to one of the pods backing the service.

A pod 286 is a structure that holds one or more containers. Each pod 286 gets a unique IP address and can communicate with other pods through a flat network without network address translation. A bridge 288 resides on worker node 262*a*-*d* and connects a pod's IP address to a network. When nodes are connected to a complex network with switches and routers, a software-defined network (SDN) makes the nodes appear as though they are connected to the same network switch. For example, the control plane in SDN makes it appear that network A 292 and network B 294 are connected even when they are physically different networks.

Figure 3:
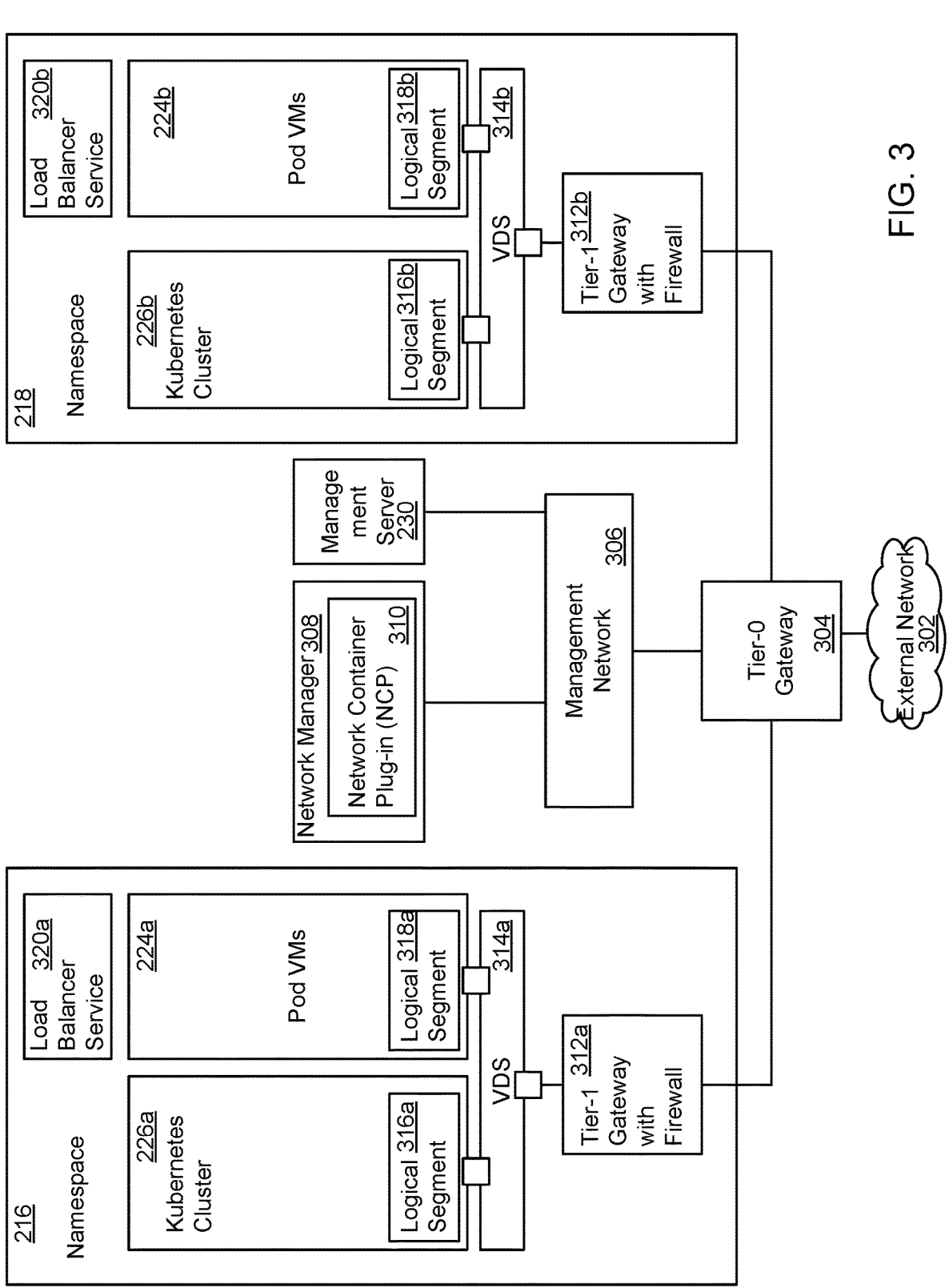
FIG. 3 depicts a system architecture with details of the networking system.

FIG. 3 depicts a system architecture with details of the networking system. The networking includes a Tier-0 gateway 304 that connects internal Tier-1 gateways 312*a, b* (e.g., that are internal to a data center) and a management network 306 to an external network 302 (e.g., that is outside the data center). The management network is a separate network on which the network manager and management server reside. Tier-0 gateway 304 is present to provide routing to the external network 302. The Tier-1 gateways 312*a,b* provide access to the namespaces and a load balancer 320*a,b* for each namespace 216, 218, respectively.

Each Tier-1 gateway 312*a,b* includes a firewall or portion of a distributed firewall (DFW). Each Tier-1 gateway 312*a,b* is also connected to a port of a virtual distributed switch (VDS) 314*a,b*, respectively, to which logical segments 316*a, b*, 318*a,b* respectively of the local network are connected via ports. One logical segment 316*a,b* connects to a Kubernetes cluster 226*a,b* respectively, and another logical segment 318*a,b* connects to pod VMs 224*a,b* respectively. The firewalls in the gateways enforce network access to and from the pods accessible by the gateways.

Figure 4:
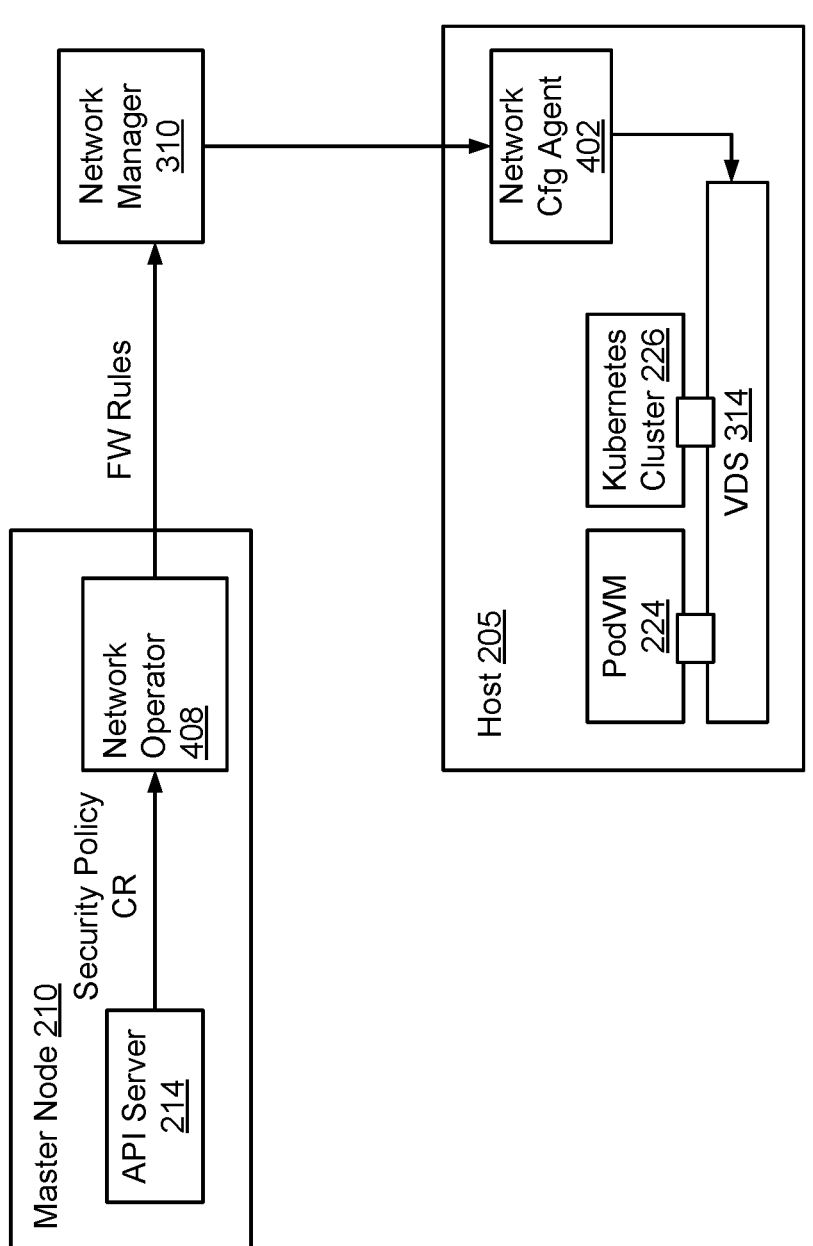
FIG. 4 depicts a simplified path for providing a security policy to the networking system, in an embodiment.

FIG. 4 depicts a simplified path for providing a security policy to the networking system, in an embodiment. The API server 214 in the master node 210 of the Supervisor Cluster 208 sends the SecurityPolicyCR to a Network Operator 408 in master node 210. The Network Operator 408 forms a set of firewall rules which then are provided to the Network Manager 310. The Network Manager 310 communicates with a network configuration agent 402 in each host/server 205 to set up the firewall rules. The firewall rules control the virtual distributed switch 314, which connects pod VMs 224 and Kubernetes Cluster 226 so that network traffic can be controlled between them. While depicted separately, Pod VMs 224 may run within Kubernetes cluster 226.

Figure 5:
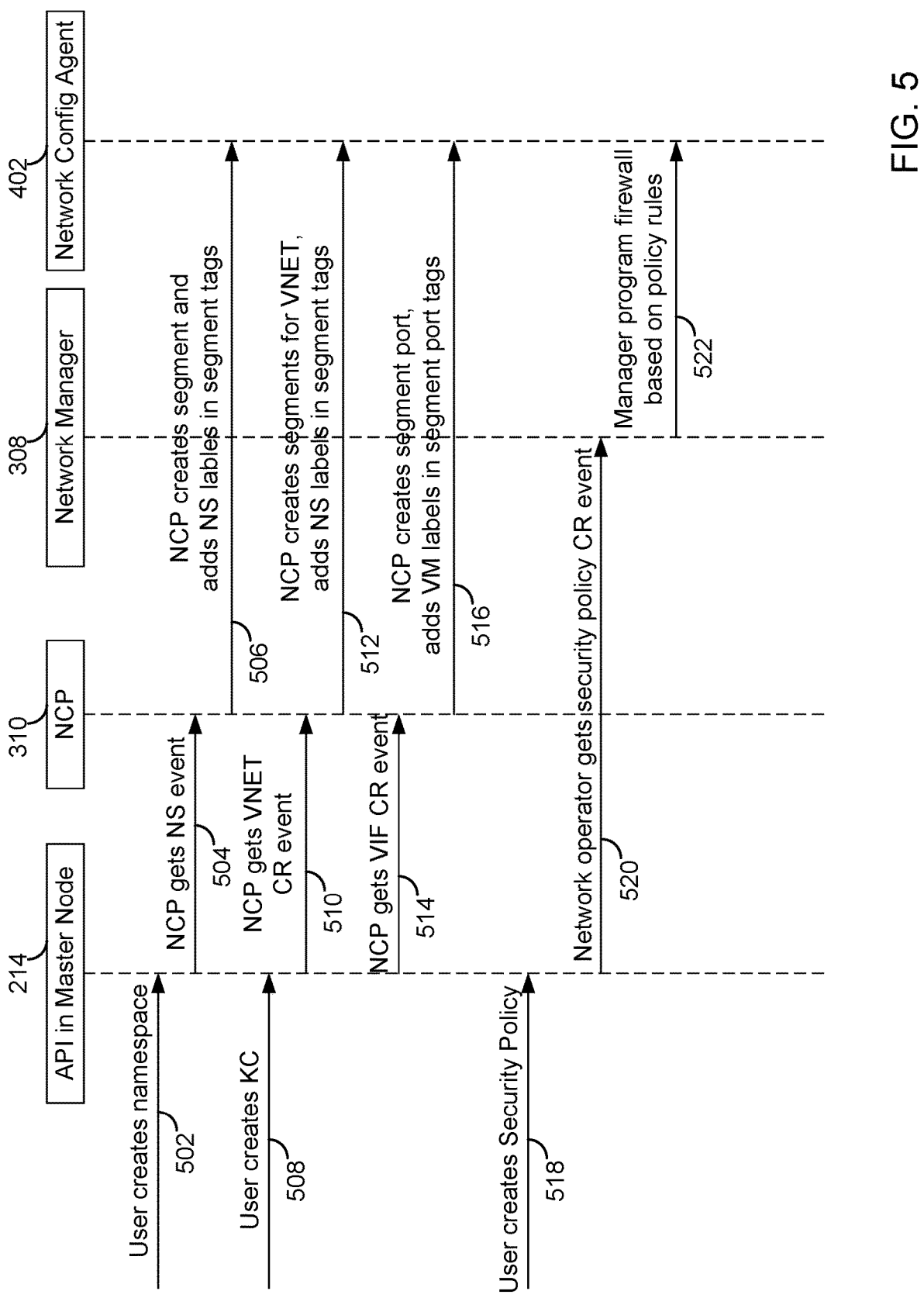
FIG. 5 depicts a flow of events for providing a security policy to the networking system based on the path in FIG. 4, in an embodiment.

FIG. 5 depicts a flow of events for providing a security policy to the networking system based on the path in FIG. 4, in an embodiment. In step 502, API server 214 receives a request from the user to create a namespace. In step 504, API server 214 sends the namespace (NS) event to NCP 310. In step 506, the NCP requests that the network config agent 402 create a network segment and adds namespace labels to tags for the network segment. In step 508, API server 214 receives a request to create a Kubernetes Cluster (KC). In step 510, the API sends a virtual network (VNET) create event to the NCP 310. In step 512, the NCP requests that the network config agent 402 create a network segment for the virtual network and add the namespace labels to tags for the network segment. In step 514, NCP gets the same event as in 510 and in step 516 requests that the network config agent 402 create a network segment port and add VM labels to tags for the segment port. In step 518, the user creates and sends a security policy CRD to API server 214. Upon receipt of the security policy CR event in step 520, API server 214 requests that the network manager 308 program a firewall based on the policy rules in step 522. For example, a policy rule may relate to communication to and from namespaces (e.g., restricting or allowing communications to and/or from and/or between particular namespaces), and the firewall may be programmed accordingly.

Figure 6:
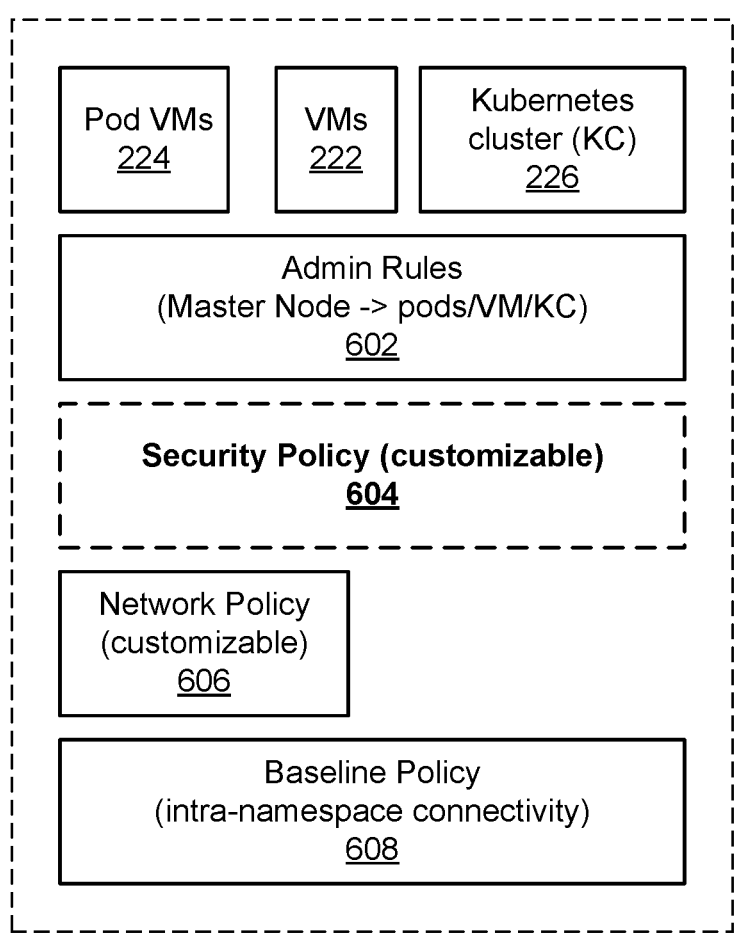
FIG. 6 depicts a stack showing the placement of the security policy, in an embodiment.

FIG. 6 depicts a stack showing the priorities of various policies, in an embodiment. The baseline policy 608 of the supervisor control plane allows the intra-Namespace traffic, all egress traffic, and traffic from the Namespace's Load-Balancer. However, the baseline disallows ingress traffic (from other Namespaces or external networks) into a Namespace. This default policy maintained for a Namespace has the lowest priority. Network policy 606 has a higher priority than baseline policy 608.

Security policy 604 is added and has a higher priority than network policy 606. Security policy 604 adds a VM selector to select VMs and adds firewall rules including Drop and Reject actions, priority, and rule level selectors (i.e., "applied to"). Each security policy is realized via a network firewall or network distributed firewall (DFW) rule, where a DFW is one implemented and distributed over a set of host computer systems. Label selectors are converted to tag-based security groups of segments and segment ports. The NCP 310 converts labels of namespaces, pod VMs, and VMs to tags on network segments and ports. Security groups are used for source and destination and applied to firewall rules.

The master node 210 admin rules have the highest priority but can be removed after the administrator 235 alters a health check not to go through the network.

Figure 7:
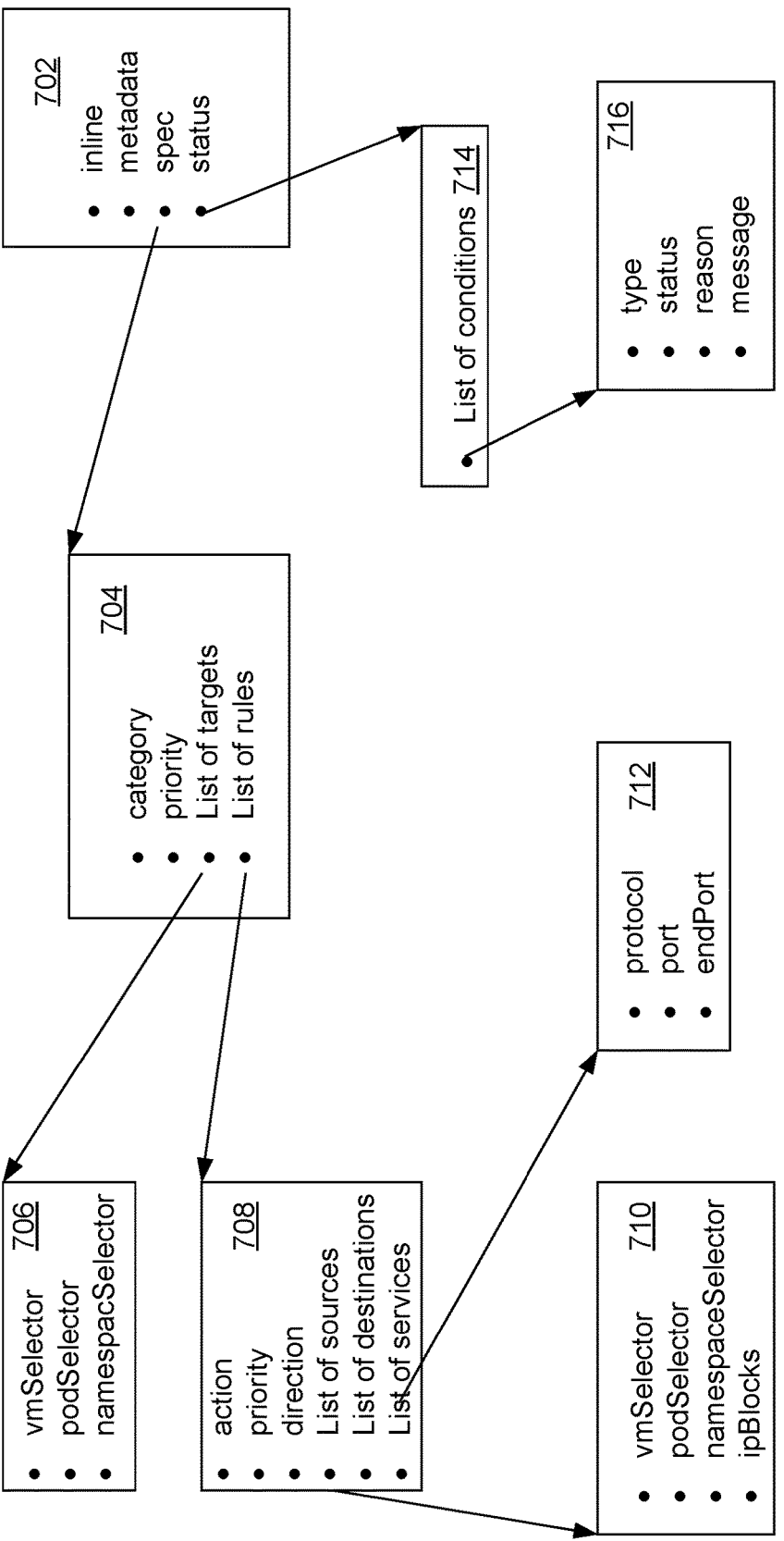
FIG. 7 depicts a set of data structures for defining a security policy, in an embodiment.

FIG. 7 depicts a set of data structures for defining a security policy custom resource definition, in an embodiment. SecurityPolicyCRD has namespace scope. Creating a SecurityPolicyCRD triggers API server 214 to create a security policy on the network side, as depicted in FIG. 5. The security policy 702 includes at least a spec field 704 and a status field 714. The spec field 702 defines a particular security policy in a given namespace and includes a category field, a priority field, a list of targets, and a list of rules. The priority field has a range of values from 0 to 1000 and defines the order of policy enforcement. For example, in one embodiment, a lower priority value makes the security policy enforceable over other policies with higher priority values.

The list of targets in the spec field 704 defines the grouping criteria of VMs, Pod VMs, and Kubernetes Clusters to which the policy is applied. Targets are generated as a Namespace group with tag criteria matching segment or segment port based on selector labels. Each Namespace group has a maximum of 5 criteria, so there are 5 groups of labels for every target. SecurityPolicyCRD targets are implemented as a list of namespace groups. The field vmSelector selects a VM, and the field podSelector selects a pod in the namespace of the SecurityPolicyCRD. The vmSelector and podSelector, namespaceSelector are labels that match a previously set-up tag. A vmSelector or podSelector without namespaceSelector selects VMs or Pods in the same namespace with SecurityPolicyCRD. The field namespaceSelector includes both VMs and Pods associated with segments in the selected namespaces.

The list of services in the list of rules field 708 includes a protocol field, a port field, and an endPort field. The port field defines a specific port or port range and is treated as the destination port.

The fields for a list of sources and a list of destinations in the list of rules field 708 include a structure 710 for a vmSelector, a podSelector, a namespaceSelector, and a set of ipBlocks. The ipBlocks field selects particular IP CIDR ranges as sources or destinations.

The fields for a list of services 712 specify a protocol, a port, and an endport for the traffic.

The fields for the list of conditions 714 specify a type, status, reason, and message relating to any error condition of the network.

FIG. 8 depicts an egress policy example, in an embodiment. In this example, policy 802 states that UDP network traffic on port 53 is not allowed out. Port 53 is associated with an internal virtual machine in namespace ns-1 with priority 20 according to the spec fields in lines 6-11.

FIG. 9 depicts an ingress policy example, in an embodiment. In this example, policy 902 states that TCP network traffic on port 8000 is allowed in. Port 8000 is associated with a virtual machine in namespace ns-1 with priority 30 according to the spec fields in lines 6-11.

FIG. 10 depicts an isolation rule, in an embodiment. In this example, rule 1002 states in lines 11-15 that no traffic is allowed in or out of namespace ns-1 with priority 20. For example, a result of the isolation rule may be that only the master node 210 can access the isolated namespace ns-1.

FIG. 11 depicts an access service rule, in an embodiment. In this example, rule 1102 states that TCP traffic is allowed in to a UI client virtual machine with priority 10 in namespace ns-3.

FIG. 12 depicts a load balancer internal allow IP rule, in an embodiment. In this example, rule 1202 states that traffic is allowed into the load balancer at a particular CIDR address in the namespace demo using source network address translation. Thus, only private traffic is allowed into the load balancer.

FIG. 13 depicts a match expression policy, in an embodiment. In this example, the match expressions in policy 1302 are used in conjunction with the vmSelector, podSelector, and namespaceSelector. Traffic from an internal pod in namespace ns-1 is allowed for keys matching the expressions in lines 13-16, where keys and their values are used to filter pod and VM matching labels as a way of selecting pods and VMs. In line 13, for key k2, the values of b1 or b2 must not be in the label. In line 15, for key k1, the values of a1, a2, or a3 must be in the label.

Figure 14:
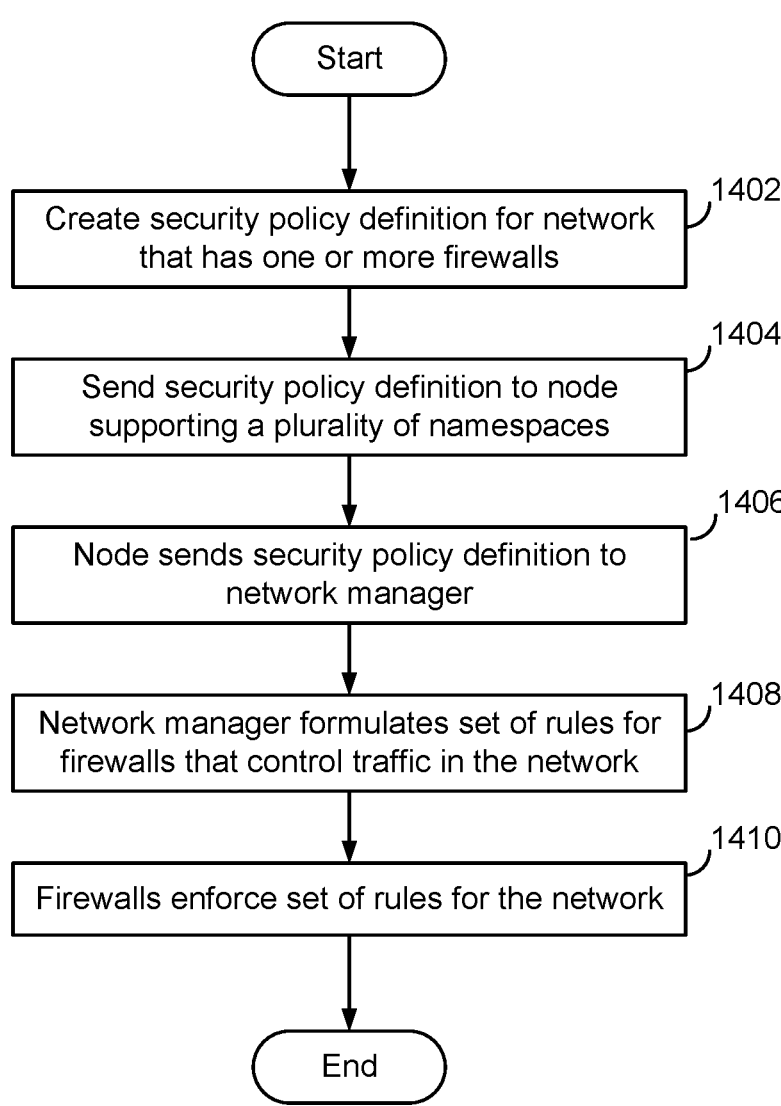
FIG. 14 depicts a flow of operations for controlling network traffic among a plurality of namespaces, in an embodiment.

FIG. 14 depicts a flow of operations for controlling network traffic among a plurality of namespaces, in an embodiment. In step 1402, a user creates a security policy definition for a network with one or more firewalls. In step 1404, the user sends the security policy definition to a node that supports the namespaces. In step 1406, the node sends the security policy definition to a network manager that manages the network for which the security policy was created. In step 1408, the network manager formulates a set of rules for the one or more firewalls of the network that control the traffic in the network. In step 1410, the firewalls enforce the set of rules for the network.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be helpful to machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data, which can thereafter be input to a computer system—computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation unless explicitly stated in the claims.

Virtualization systems, in accordance with the various embodiments, may be implemented as hosted embodiments, non-hosted embodiments, or as embodiments that tend to blur distinctions between the two. Furthermore, various virtualization operations may be wholly or partially implemented in hardware. For example, a hardware implementation may employ a look-up table for modification of storage access requests to secure non-disk data.

Certain embodiments, as described above, involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and completely isolate the application's view of the operating environments. Using OS-less containers allows resources to be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O. The term "virtualized computing instance," as used herein, is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for controlling network traffic among a plurality of namespaces, the method comprising:

creating a security policy definition describing allowed traffic on a network, the network including one or more firewalls, wherein one or more entities reside and operate in each namespace of the plurality of namespaces and have access to each other via the network; and sending the security policy definition to a node that supports the plurality of namespaces, wherein the node sends the security policy definition to a network manager that formulates a set of rules for the one or more firewalls controlling the allowed traffic on the network according to the security policy definition, and wherein the one or more firewalls enforce the set of rules controlling the allowed traffic on the network.

2. The method of claim 1, wherein the node supporting the plurality of namespaces is a master node in a Kubernetes cluster, the master node having an application programming interface that receives the security policy definition.

3. The method of claim 1, wherein the security policy definition includes a namespace and one or more of:

an ingress policy to the namespace;

an egress policy from the namespace; or a network protocol for controlling the allowed traffic on the network.

4. The method of claim 1, wherein one of the entities of the one or more entities is a virtual machine residing in a first namespace, and another one of the entities is a pod virtual machine residing in a second namespace, and the security policy definition applies to the virtual machine and the pod virtual machine.

5. The method of claim 1, wherein one of the entities of the one or more entities is a pod virtual machine residing in a first namespace, and another one of the entities of the one or more entities is a Kubernetes cluster associated with a second namespace, and the security policy definition applies to the Kubernetes cluster and the pod virtual machine.

6. The method of claim 1, wherein the security policy definition includes a namespace and allows no traffic in or out of the namespace.

7. The method of claim 1, wherein one of the entities of the one or more entities is a load balancer service, and the security policy definition allows traffic only into and not out of the load balancer service.

8. A system comprising:

a supervisor cluster having a master node and supporting a plurality of namespaces;

an entity residing and operating in each of the namespaces in the plurality of namespaces; and a network providing access among each of the respective entities, the network including one or more firewalls;

wherein the master node is configured to:

receive a security policy definition describing allowed traffic on the network; and send the security policy definition to a network manager that formulates a set of rules for the one or more firewalls controlling the allowed traffic on the network according to the security policy definition, wherein the one or more firewalls enforce the set of rules controlling the allowed traffic on the network.

9. The system of claim 8, wherein the master node has an application programming interface that receives the security policy definition.

10. The system of claim 8, wherein the security policy definition includes a namespace and one or more of:

an ingress policy to the namespace;

an egress policy from the namespace; or a network protocol for controlling the allowed traffic on the network.

11. The system of claim 8, wherein one of the entities of the one or more entities is a virtual machine residing in a first namespace, and another one of the entities is a pod virtual machine residing in a second namespace, and the security policy definition applies to the virtual machine and the pod virtual machine.

12. The system of claim 8, wherein one of the entities of the one or more entities is a pod virtual machine residing in a first namespace, and another one of the entities of the one or more entities is a Kubernetes cluster associated with a second namespace, and the security policy definition applies to the Kubernetes cluster and the pod virtual machine.

13. The system of claim 8, wherein the security policy definition includes a namespace and allows no traffic in or out of the namespace.

14. The system of claim 8, wherein one of the entities of the one or more entities is a load balancer service, and the security policy definition allows traffic only into and not out of the load balancer service.

15. A non-transitory computer-readable medium comprising instructions, which, when executed, cause a computer system to carry out a method for controlling network traffic among a plurality of namespaces, the method comprising:

creating a security policy definition describing allowed traffic on a network, the network including one or more firewalls, wherein one or more entities reside and operate in each namespace of the plurality of namespaces and have access to each other via the network; and sending the security policy definition to a node that supports the plurality of namespaces, wherein the node sends the security policy definition to a network manager that formulates a set of rules for the one or more firewalls controlling the allowed traffic on the network according to the security policy definition, and wherein the one or more firewalls enforce the set of rules controlling the allowed traffic on the network.

16. The non-transitory computer-readable medium of claim 15, wherein the node supporting the plurality of namespaces is a master node in a Kubernetes cluster, the master node having an application programming interface that receives the security policy definition.

17. The non-transitory computer-readable medium of claim 15, wherein the security policy definition includes a namespace and one or more of:

an ingress policy to the namespace;

an egress policy from the namespace, or a network protocol for controlling the allowed traffic on the network.

18. The non-transitory computer-readable medium of claim 15, wherein one of the entities of the one or more entities is a pod virtual machine residing in a first namespace, and another one of the entities of the one or more entities is a Kubernetes cluster associated with a second namespace, and the security policy definition applies to the Kubernetes cluster and the pod virtual machine.

19. The non-transitory computer-readable medium of claim 15, wherein one of the entities is a pod virtual machine residing in a first namespace, and another one of the entities is a Kubernetes cluster associated with a second namespace, and the security policy definition applies to the Kubernetes cluster and the pod virtual machine.

20. The non-transitory computer-readable medium of claim 15, wherein one of the entities of the one or more entities is a load balancer service, and the security policy definition allows traffic only into and not out of the load balancer service.

* * * * *